United States Patent
Fulayter et al.

(10) Patent No.: US 9,896,948 B2
(45) Date of Patent: Feb. 20, 2018

(54) GAS TURBINE ENGINE BLADE AND DISK

(71) Applicant: Rolls-Royce Corporation, Indianapolis, IN (US)

(72) Inventors: Roy David Fulayter, Avon, IN (US); Jonathan Michael Rivers, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 962 days.

(21) Appl. No.: 14/133,140

(22) Filed: Dec. 18, 2013

(65) Prior Publication Data

US 2014/0241890 A1 Aug. 28, 2014

Related U.S. Application Data

(60) Provisional application No. 61/768,995, filed on Feb. 25, 2013.

(51) Int. Cl.
F01D 5/30 (2006.01)
F01D 5/00 (2006.01)
(Continued)

(52) U.S. Cl.
CPC ............ F01D 5/3061 (2013.01); B23K 20/12 (2013.01); B23P 15/02 (2013.01); F01D 5/005 (2013.01);
(Continued)

(58) Field of Classification Search
CPC .......... F01D 5/005; F01D 5/34; F01D 5/3061; F05D 2230/239; B23K 20/12; B23P 15/02
See application file for complete search history.

(56) References Cited

U.S. PATENT DOCUMENTS 3,982,854 A * 9/1976 Berry .................. F01D 5/28
416/213 R
5,031,288 A * 7/1991 Sadler ................ B23K 20/1205
228/112.1
(Continued)

FOREIGN PATENT DOCUMENTS

DE 102007062557 A1 6/2009
EP 1239116 A2 9/2002
(Continued)

OTHER PUBLICATIONS

International Preliminary Report on Patentability from Internatinal Application No. PCT/US2013/076185, dated Sep. 3, 2015, 9 pp.
(Continued)

*Primary Examiner* — Ninh H Nguyen
*Assistant Examiner* — Brian P Wolcott
(74) *Attorney, Agent, or Firm* — Shumaker & Sieffert, P.A.

(57) ABSTRACT

In some examples, an apparatus may include a gas turbine engine component comprising a blade, a platform forming an airflow surface from which the blade extends on one side, and a motion weld receiving surface disposed on a non-airflow side of the platform, and a disk having a motion weld disk portion to receive the motion weld receiving surface of the gas turbine engine component and form a motion weld coupling when the disk and gas turbine engine component are coupled, wherein, prior to coupling, the gas turbine engine component further includes a blade stalk disposed on the non-airflow side of the platform and in which is formed the motion weld receiving surface.

8 Claims, 3 Drawing Sheets

(51) Int. Cl.
  *F01D 5/34* (2006.01)
  *B23P 15/02* (2006.01)
  *B23K 20/12* (2006.01)

(52) U.S. Cl.
  CPC .......... *F01D 5/34* (2013.01); *F05D 2230/239* (2013.01); *Y10T 29/49318* (2015.01); *Y10T 29/49336* (2015.01)

(56) References Cited

U.S. PATENT DOCUMENTS

| | | | | |
|---|---|---|---|---|
| 5,486,262 | A * | 1/1996 | Searle | B23K 20/1205 156/580 |
| 5,797,182 | A | 8/1998 | Furlan et al. | |
| 5,876,183 | A | 3/1999 | Furlan et al. | |
| 6,106,233 | A * | 8/2000 | Walker | B23K 20/1205 228/112.1 |
| 6,478,545 | B2 * | 11/2002 | Crall | B23K 20/129 29/889.1 |
| 6,666,653 | B1 | 12/2003 | Carrier | |
| 7,445,433 | B2 | 11/2008 | Chivers et al. | |
| 7,448,844 | B1 * | 11/2008 | Johnson | F03B 3/12 29/402.08 |
| 7,648,340 | B2 * | 1/2010 | Sadler | F01D 5/141 416/223 A |
| 7,793,540 | B2 * | 9/2010 | Robbins | G01M 1/16 73/459 |
| 8,006,380 | B2 * | 8/2011 | Rawson | B23K 20/1205 29/402.09 |
| 8,267,663 | B2 * | 9/2012 | Larose | B23K 20/1205 416/213 R |
| 8,356,980 | B2 * | 1/2013 | Izadi | B23K 20/12 29/889.2 |
| 2005/0274010 | A1 | 12/2005 | Rawson et al. | |
| 2008/0107533 | A1 | 5/2008 | Carrier et al. | |
| 2009/0185908 | A1 | 7/2009 | Chung et al. | |
| 2009/0249622 | A1 * | 10/2009 | Schreiber | B23K 20/12 29/889 |
| 2010/0272572 | A1 | 10/2010 | Bayer | |

FOREIGN PATENT DOCUMENTS

| | | |
|---|---|---|
| EP | 2281653 A1 | 2/2011 |
| EP | 2339117 A2 | 6/2011 |
| EP | 2444192 A2 | 4/2012 |

OTHER PUBLICATIONS

International Search Report and Written Opinion from counterpart international application No. PCT/US2013/076185, dated Apr. 1, 2014, 13 pp.

* cited by examiner

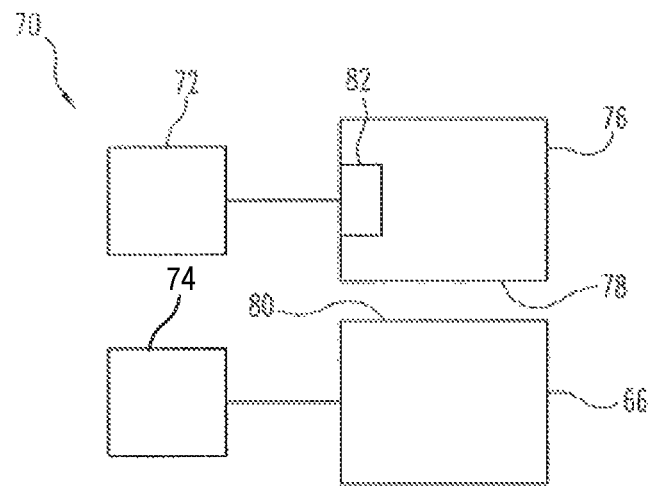
Fig. 5
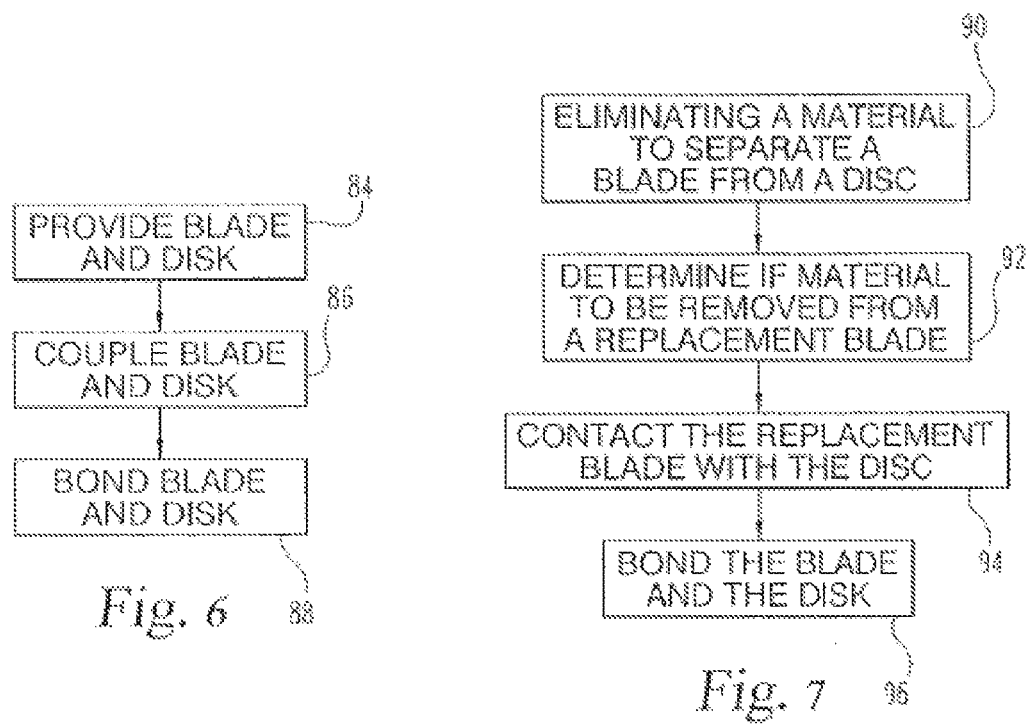
Fig. 6
Fig. 7

GAS TURBINE ENGINE BLADE AND DISK

This application claims the benefit of U.S. Provisional Application No. 61/768,995, filed Feb. 25, 2013, which is incorporated herein by reference in its entirety.

TECHNICAL FIELD

The present disclosure generally relates to coupling gas turbine engine components.

BACKGROUND

Coupling a gas turbine engine blade with a disk and/or making repairs of the blade and/or disk remains an area of interest. Some existing systems have various shortcomings relative to certain applications. Accordingly, there remains a need for further contributions in this area of technology.

SUMMARY

In one example, the disclosure describes an apparatus including a gas turbine engine component comprising a blade, a platform forming an airflow surface from which the blade extends on one side, and a motion weld receiving surface disposed on a non-airflow side of the platform, and a disk having a motion weld disk portion to receive the motion weld receiving surface of the gas turbine engine component and form a motion weld coupling when the disk and gas turbine engine component are coupled. Prior to coupling, the gas turbine engine component may further include a blade stalk disposed on the non-airflow side of the platform and in which is formed the motion weld receiving surface.

In another example, the disclosure describes a method that includes imparting loads through a platform of a gas turbine engine blade to place the blade into contact with a gas turbine engine disk, and creating a relative movement between the blade and the disk to weld the blade and disk together.

In a further example, the disclosure describes a method that includes eliminating a material from an integrated turbomachinery component that includes a blade and a disk to remove the blade from the disk, determining whether to remove a portion of a replacement blade to be coupled with the disk in place of the removed blade, and friction welding the replacement blade to the disk.

BRIEF DESCRIPTION OF THE FIGURES

FIG. 5 is a schematic and conceptual diagram that depicts an example assembly device.

FIG. 6 is a flow diagram that depicts an example technique for joining a blade and disk.

FIG. 7 is a flow diagram that depicts an example technique for replacing a blade with a disk.

DETAILED DESCRIPTION

Figure 1:
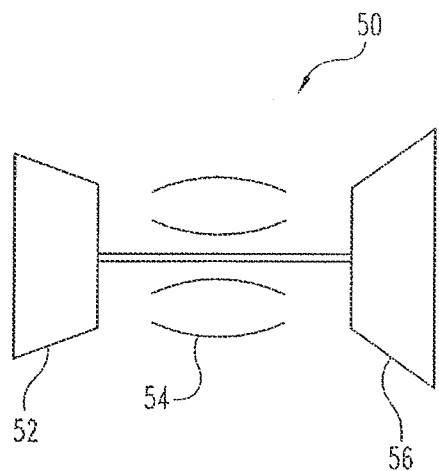
FIG. 1 is a schematic and conceptual diagram that depicts an example gas turbine engine.

For the purposes of promoting an understanding of the principles of the disclosure, reference will now be made to the examples illustrated in the drawings and specific language will be used to describe the same. It will nevertheless be understood that no limitation of the scope of the disclosure is thereby intended. Any alterations and further modifications in the described examples, and any further applications of the principles of the disclosure as described herein are contemplated as would normally occur to one skilled in the art to which the disclosure relates.

FIG. 1 is a schematic and conceptual diagram that depicts an example gas turbine engine. With reference to FIG. 1, an example gas turbine engine 50 is disclosed that includes a compressor 52, combustor 54, and turbine 56. Gas turbine engine 50 operates by receiving a stream of working fluid, compressing the working fluid with the compressor 52, and delivering the compressed working fluid to the combustor 54, where it is mixed with fuel and combusted. The turbine 56 receives products of combustion and extracts work therefrom to provide power to the compressor 52, among other useful devices.

The gas turbine engine 50 can take a variety of forms in other examples. To set forth just a few non-limiting examples, the gas turbine engine 50 can take the form of a turbojet, turbofan, turboshaft, and turboprop. Though the gas turbine engine 50 is depicted as a single spool engine, in other embodiments the gas turbine engine 50 can include any number of spools. For example, the gas turbine engine 50 can include turbomachinery components such as a fan that can be associated with multi-spool engines. Other examples can include intermediate pressure turbomachinery components such as would be associated with three spool engines. Other variations are contemplated herein. In some examples, the gas turbine engine can be an adaptive and/or variable cycle engine.

In some examples, gas turbine engine 50 can be used to provide power to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the examples described herein are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2:
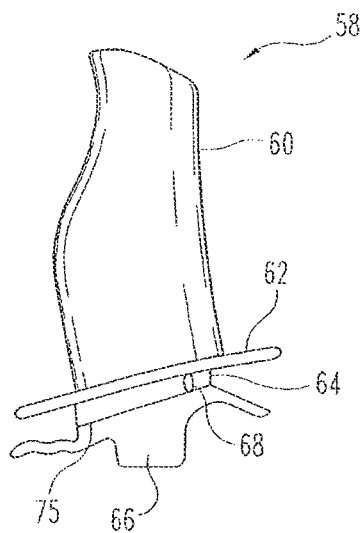
FIG. 2 is a schematic and conceptual diagram that depicts a view of an example turbomachinery component.
Figure 3:
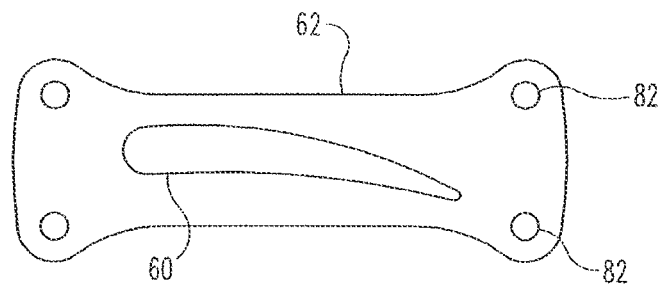
FIG. 3 is a schematic and conceptual diagram that depicts a view of an example turbomachinery component.
Figure 4:
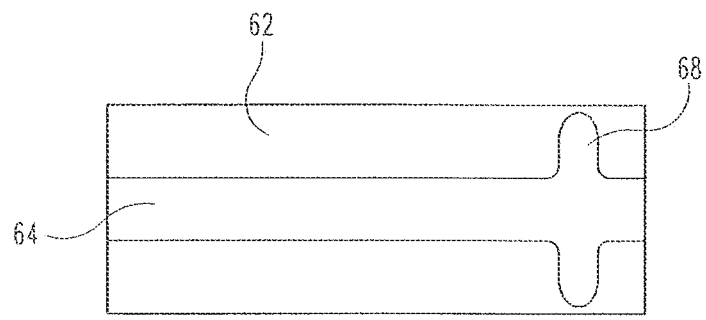
FIG. 4 is a schematic and conceptual diagram that depicts a view of an example turbomachinery component.

FIGS. 2-4 are schematic and conceptual diagrams that illustrate various views of an example turbomachinery component 58. In the example of FIGS. 2-4, turbomachinery component 58 includes a turbofan component. Turbomachinery component 58 includes a blade 60, platform 62, stalk 64, and a disk 66. In some examples, blade 60, platform 62, and stalk 64 may be formed as an integrated component prior to being coupled with disk 66. The integrated component can be formed using a variety of techniques, one of which may include casting the blade 60, platform 62, and stalk 64 as an integrated whole. Various casting techniques, as well as other approaches, are contemplated herein for the formation of an integrated blade, 60, platform 62, and stalk 64. In some examples, the component may not include one or more of the individual elements. For example, the integrated component can include the blade 60 and the stalk 64. As such, the term integrated component can refer to any or all of the elements mentioned above, alone, or in addition to others. For convenience, the integrated component may sometimes be referred to simply as a blade, to which can include any variation of the integrated component referred to above.

Blade 60 can take a variety of shapes and sizes suitable to any given application. In some examples, blade 60 includes an airfoil shape having a relatively high pressure side and a relatively low pressure side when in use. Blade 60 can have any variety of geometry such as twist and stagger and generally will taper from its base near platform 62 to the tip of blade 60.

Platform 62 can include a surface that is used to define a flow path for working fluid flowing through a turbomachinery component 58. For example, platform 62 may include a surface near the base of turbomachinery component 58 that defines an inner wall of the duct segment through which component 58 rotates. Platform 62 can extend from the base of blade 60 toward an adjacent blade 60 such that the duct flow path surface is formed to bound a working fluid flowing through turbomachinery component 58. An outer surface of the duct disposed radially outward of blade 60 can be a casing wall. As will be appreciated, therefore, platform 62 includes a side over which a working fluid flows and an opposite side in which substantially less, if any, working fluid flows as a result of flow path leakage, among other possible reasons. In some examples, platform 62 extends laterally and axially further than the base of blade 60, as can be seen in FIG. 3. Other configurations of platform 62 are contemplated herein.

Stalk 64 extends from platform 62 and is situated on the side of platform 62 opposite from blade 60 in the illustrated example. Stalk 64 can take on any shape and size and may be smaller axially and laterally than platform 62, though other variations are contemplated herein. Stalk 64 can include a surface that is coupled with a surface of disk 66 as will be discussed further below.

In the illustrated example, the integrated component of the blade 60, platform 62, and stalk 64 includes a seal 68 useful in discouraging a flow of working fluid on the side of platform 62 from which stalk 64 extends. Seal 68 can be a pressure seal and is shown projecting from stalk 64 and/or platform 62. Seal 68 can be any dimension and, in some examples, extends to a lateral side of platform 62 such as in the circumferential direction as referenced when the integrated component is coupled to disk 66.

Turning now to FIG. 5 and with continuing reference to FIG. 3, an example of an assembly device 70 used to couple an integrated component, such as an integrated blade 60 and stalk 64, with disk 66 is shown. Assembly device 70 includes a first part 72 and a second part 74, which are secured to integrated component 76 and disk 66, respectively. First part 72 and Second part 74 can be used to bond integrated 76 component to disk 66 using the techniques described herein, among potential others, and as is depicted by bond 75 shown in FIG. 3. The bonding can occur between the respective materials of integrated component 76 and disk 66. For example, the bonding can occur as a result of contact between a metallic integrated blade 60 and stalk 64 and a metallic disk 66. In some examples, bonding can be the result of relative movement between the two, such as a reciprocating motion, to set forth a non-limiting example.

Such reciprocating motion can be used in a friction welding process. During friction welding a compressive relative movement can be provided via first part 72 and second part 74 of assembly device 70 between integrated component 76 and disk 66 to create a zone of plastic and/or melted metallic material between integrated component 76 and disk 66. When assembly device 70 ceases to induce the compressive relative movement between integrated component 76 and disk 66, the plastic and/or melted material at an interface of integrated component 76 and disk 66 may solidify to create a bond.

Relative movement between integrated component 76 and disk 66 means that the integrated component 76 and disk 66 are moved relative to each other. No limitation is implied as to the type or duration of the motion. Further, integrated component 76 may move relative to a reference frame while disk 66 is stationary, disk 66 may move relative to a reference frame while integrated component 76 is stationary, or both integrated component 76 and disk 66 may move relative to a reference frame. To state that one item is moving relative to another can mean that the item is moved while the other is placed in a stationary fixture, but it can also mean in the most generic sense that the items are moved relative to each other and no special significance is ascribed to whether the item is relatively stationary, such as in a stationary fixture, or whether the item is moved and its counterpart is maintained relatively stationary.

As discussed above, integrated component 76 and disk 66 can be coupled by placing surfaces of each into contact with each other. For example, an integrated component surface 78 and a disk surface 80 can be placed into contact with each other and be bonded together via action of the assembly device 70. Surfaces 78 and 80 can take on a variety of shapes may or may not be complementary with each other. In some examples, integrated component surface 78 is flat and disk surface 80 is likewise flat. Not all examples of surfaces 78 and 80, however, are flat. In some examples, integrated component surface 78 is formed at the end of stalk 64.

Assembly device 70, and in particular first part 72 shown in the illustrated example, is operable to engage one or more fixture features 82 of integrated component 76. As shown in FIG. 3, platform 62 includes a number of fixture features 82 which can be engaged by assembly device 70 to secure integrated component 76 to first part 72 of assembly device 70. In some examples, fixture features 82 are used to impart loads through platform 62 to integrated component 76. Such loads can be used in coupling integrated component 76 and disk 66 together. In some examples, fixture features 82 are used to impart relative motion between disk 66 and integrated component 76 as described above with regard to friction welding. Fixture features 82 of the illustrated example are in the form of a number of openings defined in platform 62. The openings can be through-holes in some examples, but in other examples, may be a depression or aperture formed within integrated component 76. For example, fixture features 82 can be blind bores. In other alternative and/or additional examples, one or more of fixture features 82 can be formed as an extension from integrated component 76, such as a standoff, that can be secured by an appropriate portion of assembly device 70. Though four fixture features 82 are shown in the illustrated example, any number of fixture features 82 can be used in other examples. Not all fixture features 82 in any given embodiment of integrated component 76 need be the same. For example, some fixture features 82 can be through-holes while others are depressions.

In some examples, fixture features 82 are removed and/or addressed through other techniques after integrated component 76 is coupled with the disk 66. For example, fixture features 82 can be addressed by mechanically removing fixture features 82 from integrated component 76 such that they are not present when the completed turbomachinery component is used within gas turbine engine 50. Such mechanical removal can take the form of grinding or milling, among possible other approaches. Alternatively and/or additionally, fixture features 82 can be removed using a variety of approaches not limited to mechanical removal. For example, fixture features 82 can be removed by wire electro-discharge machining. In some examples, fixture features 82 can be covered, such as by filling fixture features 82 with a material when the feature is in the form of a hole or depression. Any number of other approaches to addressing fixture features 82 are contemplated herein.

FIG. 6 is an example flow diagram that depicts an example technique for bonding integrated component 76 and disk 66 together. As illustrated by reference numeral 84, a blade (e.g., blade 60) and a disk (e.g., disk 66) can be provided for purposes of assembling the blade and disk together. The blade and/or disk can be provided by, for example, either manufacturing the items or by purchasing from a vendor or other suitable source. In other examples of the technique depicted in FIG. 6, the blade can be integrated with any of the elements mentioned above to provide an integrated component (e.g., integrated component 76). The blade and disk are coupled together as illustrated by reference number 86. The blade can include a surface, or is coupled with a portion that includes the surface, that can be then be coupled with a corresponding surface of the disk. As discussed above, in some examples, the surfaces of each the blade and the disk can be complementary in shape. Reference numeral 88 of the illustrated example depicts the bonding of the blade and disk which can be accomplished using any of the techniques described above.

FIG. 7 is a flow diagram that depicts an example technique for removing an integrated component from a turbomachinery component such as a disk. Reference numeral 90 depicts eliminating a material from the integrated turbomachinery component to separate a blade from a disk. The material can be eliminated using any variety of approaches, whether mechanical, electrical, or otherwise. In some examples, the blade and disk can be separated using an electrical discharge machining (EDM) machine by arranging the wire axially and passing the wire from the EDM around the base of the blade in a combination of radial and circumferential movement. Other arrangements and movements of the EDM wire are contemplated. The material separated from the blade and disk can be in a variety of shapes such as a rectangular notch. The material eliminated can be enough to allow the separation of the entirety of the original stalk of the blade from the disk, it can allow the separation of only a portion of the original stalk and possibly disk, or it can allow the separation of the original stalk as well as some material of the original disk, among any other possibility. In some examples, the material can be removed from the blade and/or stalk through a milling operation, among potential others.

Reference numeral 92 depicts a step that includes determining if material is to be removed from a replacement blade. In some examples, a replacement blade can be processed, or at least can be evaluated to determine whether the replacement blade should be processed, prior to bonding the blade to the disk. In some examples, the replacement blade can include a portion, such as a stalk, that can have additional material not needed in every replacement. In some replacement operations in which an amount of material is removed from the disk relative to the original dimensions of the disk, the stalk of the blade can be sized accordingly to account for the lost amount of material from the disk to ensure the continued radial positioning of the blade. For example, if a replacement blade includes a stalk that is oversized for an original placement of the blade with the disk, the stalk can be resized to shorten the stalk through a variety of approaches, whether mechanical, electrical, or otherwise. For example, the stalk can be removed using an EDM machine. The stalk can be sized to allow a wide range of material to be removed to account for a variety of replacement needs. In addition, in some examples, a coupled blade and disk may need to be repaired on multiple occasions, which may permit multiple removal and replacement operations of the blade. In some such examples, a number of cuts over time may be made to the disk, each incrementally removing more of the original disk material. In some examples, in each subsequent replacement operation, the stalk of the individual blades may be cut to different sizes to account for the incremental removal of disk material.

Reference numerals 94 and 96 depict contacting the blade with the disk and bonding both together. Such operations can be similar to any of the variety of examples described above.

In some examples, the disclosure describes an apparatus comprising a gas turbine engine component comprising a blade, a platform forming an airflow surface from which the blade extends on one side, and a motion weld receiving surface disposed on a non-airflow side of the platform, and a disk having a motion weld disk portion to receive the motion weld receiving surface of the gas turbine engine component and form a motion weld coupling when the disk and gas turbine engine component are coupled, wherein, prior to coupling, the gas turbine engine component further includes a blade stalk disposed on the non-airflow side of the platform and in which is formed the motion weld receiving surface.

In some examples, the platform further includes a fixture feature structured to engage an assembly device capable of providing relative motion between the gas turbine engine component and the disk to form a friction weld coupling.

In some examples, the fixture feature includes an aperture formed in the platform, the aperture removed after welding of the gas turbine engine component to the disk.

In some examples, the blade stalk includes a portion that is configured to be removed to form the motion weld receiving surface.

In some examples, the blade stalk includes a pressure seal formed therein to discourage flow path leakage on the non-airflow side of the platform.

In some examples, the motion weld receiving surface is a flat surface, and wherein the motion weld disk portion is a complementary flat surface.

In some examples, the disclosure describes a method comprising imparting loads through a platform of a gas turbine engine blade to place the blade into contact with a gas turbine engine disk, and creating a relative movement between the blade and the disk to weld the blade and disk together.

In some examples, the method further includes removing a portion of the blade prior to imparting the loads through the platform, and wherein creating the relative movement between the blade and disk forms a friction weld between the blade and the disk.

In some examples, the method further includes removing the blade from the disk.

In some examples, removing the blade from the disk includes activating a wire electro-discharge machining device used to separate a stem of the blade from the disk.

In some examples, the method further includes engaging a friction weld device to a fixture feature of the blade.

In some examples, the blade includes a platform in which is formed the fixture feature, and the method further includes addressing the fixture feature of the platform to discourage interaction of the fixture feature with a moving stream when the welded blade and disk are used in operation of a gas turbine engine.

In some examples, the disclosure describes a method comprising eliminating a material from an integrated turbomachinery component that includes a blade and a disk to remove the blade from the disk, determining whether to remove a portion of a replacement blade to be coupled with the disk in place of the removed blade, and friction welding the replacement blade to the disk.

In some examples, eliminating the material from the integrated turbomachinery component includes engaging a wire EDM to the integrated turbomachinery component to remove the blade.

In some examples, the integrated turbomachinery component includes a stalk and a platform having fixture features formed therein, and the method further includes addressing the fixture features of the platform such that they are not exposed to a stream of working fluid during operation of the integrated turbomachinery component.

In some examples, friction welding the replacement blade to the disk includes coupling an assembly device to the fixture features of the integrated turbomachinery component, the assembly device operable to friction weld the replacement blade to the disk.

In some examples, the method further includes balancing the integrated turbomachinery component.

In some examples, balancing the integrated turbomachinery component occurs after friction welding the replacement blade to the disk, and balancing the integrated turbomachinery component includes adding weight to the turbomachinery component.

In some examples, the integrated turbomachinery component further includes a platform, and the method further includes disposing a seal on a non-flow path side of the platform of the integrated turbomachinery component.

In some examples, determining whether to remove the portion of the replacement blade to be coupled with the disk in place of the removed blade includes assessing an amount of disk removed as a result of eliminating the material from the integrated turbomachinery component.

While the disclosure has been illustrated and described in detail in the drawings and foregoing description, the same is to be considered as illustrative and not restrictive in character, it being understood that only some examples have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and examples lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    eliminating a material from an integrated turbomachinery component that includes a blade and a gas turbine engine disk to remove the blade from the gas turbine engine disk;
    determining whether to remove a portion of a replacement gas turbine engine component to be coupled with the gas turbine engine disk in place of the removed blade; and
    friction welding the replacement gas turbine engine component to the gas turbine engine disk by at least:
        imparting loads through a platform of the replacement gas turbine engine component to place a motion welding surface of a blade stalk of the replacement gas turbine engine component into contact with a motion weld disk portion of the gas turbine engine disk, wherein the replacement gas turbine engine component comprises a replacement blade, the platform that forms an airflow surface from which the replacement blade extends on one side, and the blade stalk that is disposed on a non-airflow side of the platform and in which is formed the motion welding surface; and
        creating a relative movement between the replacement gas turbine engine component and the gas turbine engine disk to weld the replacement gas turbine engine component and the gas turbine engine disk together.

2. The method of claim 1, wherein eliminating the material from the integrated turbomachinery component comprises engaging a wire EDM to the integrated turbomachinery component to remove the blade.

3. The method of claim 2, wherein the platform has fixture features formed therein, further comprising addressing the fixture features of the platform such that they are not exposed to a stream of working fluid during operation of the integrated turbomachinery component.

4. The method of claim 3, wherein friction welding the replacement gas turbine engine component to the gas turbine engine disk comprises coupling an assembly device to the fixture features of the integrated turbomachinery component, the assembly device operable to friction weld the replacement gas turbine engine component to the gas turbine engine disk.

5. The method of claim 1, further comprising balancing the integrated turbomachinery component.

6. The method of claim 5, wherein balancing the integrated turbomachinery component occurs after friction welding the replacement gas turbine engine component to the gas turbine engine disk, and wherein balancing the integrated turbomachinery component comprises adding weight to the integrated turbomachinery component.

7. The method of claim 1, wherein the integrated turbomachinery component further includes integrated turbomachinery component platform, further comprising disposing a seal on a non-flow path side of the integrated turbomachinery component platform.

8. The method of claim 1, wherein determining whether to remove the portion of the replacement gas turbine engine component to be coupled with the gas turbine engine disk in place of the removed blade includes assessing an amount of gas turbine engine disk removed as a result of eliminating the material from the integrated turbomachinery component.

* * * * *